United States Patent
McEvoy et al.

(10) Patent No.: US 8,647,997 B2
(45) Date of Patent: Feb. 11, 2014

(54) ZEOLITE MEMBRANE AND METHODS OF MAKING THE SAME

(75) Inventors: Kevin Paul McEvoy, Ballston Spa, NY (US); Hrishikesh Keshavan, Clifton Park, NY (US); Anthony Yu-Chung Ku, Rexford, NY (US); Steven Mitchell Kuznicki, Alberta (CA); Weizhu An, Alberta (CA); Lan Wu, Alberta (CA); Paul Donald Swenson, Alberta (CA)

(73) Assignee: General Electric Company, Niskayuna, NY (US)

( * ) Notice: Subject to any disclaimer, the term of this patent is extended or adjusted under 35 U.S.C. 154(b) by 361 days.

(21) Appl. No.: 12/957,151

(22) Filed: Nov. 30, 2010

(65) Prior Publication Data

US 2012/0135215 A1    May 31, 2012

(51) Int. Cl.
*B01J 20/28* (2006.01)
*B01J 20/16* (2006.01)
*B01J 29/06* (2006.01)

(52) U.S. Cl.
USPC .................................. 502/4; 502/60

(58) Field of Classification Search
USPC ...................................... 502/4, 60
See application file for complete search history.

(56) References Cited

U.S. PATENT DOCUMENTS

| | | | |
|---|---|---|---|
| 5,110,596 A * | 5/1992 | Magruder et al. | 424/438 |
| 5,753,121 A * | 5/1998 | Geus et al. | 210/490 |
| 6,051,517 A * | 4/2000 | Funke et al. | 502/4 |
| 6,248,682 B1 | 6/2001 | Thompson et al. | |
| 6,440,885 B1 | 8/2002 | Pierotti et al. | |
| 6,503,294 B2 | 1/2003 | Yoshikawa et al. | |
| 6,967,181 B2 * | 11/2005 | Muller et al. | 502/64 |
| 7,049,259 B1 | 5/2006 | Deckman et al. | |
| 7,614,505 B2 | 11/2009 | Isomura | |
| 2002/0192155 A1 * | 12/2002 | Sterte et al. | 423/700 |
| 2006/0062982 A1 | 3/2006 | Hammond et al. | |
| 2009/0000475 A1 | 1/2009 | Fekety et al. | |
| 2009/0149313 A1 * | 6/2009 | Liu et al. | 502/4 |

OTHER PUBLICATIONS

Zhang Xiongfu, et al., Factors affecting the formation of zeolite seed layers and the effects of seed layers on the growth of zeolite silicalite-1 membranes. downloaded from the internet http://www.springerlink.com/content/qg13741535207063/, (2007).

* cited by examiner

*Primary Examiner* — Elizabeth Wood
(74) *Attorney, Agent, or Firm* — Francis T. Coppa

(57) ABSTRACT

A free-standing zeolite membrane and a zeolite membrane supported on a support structure are disclosed. The free-standing zeolite membrane is fabricated by mixing zeolite particles and an optional inorganic binder, forming a green body, and sintering the green body at a sufficiently low temperature so as to prevent damage to the gas selectivity properties of the zeolite particles. The supported composite zeolite membrane is fabricated by mixing a sacrificial binder, an optional inorganic binder, boehmite sol and zeolite particles to form a slurry. The slurry is then coated onto a porous support structure, dried and sintered at a sufficiently low temperature so as to prevent damage to the gas selective properties of the zeolite particles. In both membranes, the zeolite particles span the entire thickness of the membrane to provide a high selectivity path for the flow of gas to pass therethrough.

6 Claims, 11 Drawing Sheets

ZEOLITE MEMBRANE AND METHODS OF MAKING THE SAME

BACKGROUND

Zeolites are microporous, aluminosilicate minerals. They possess well-defined pore structures and have high specific surface area. These features have been exploited in a number of commercial applications including adsorbents and catalysts.

Zeolites are classified according to their framework types as defined by the International Zeolite Association (IZA) Commission on natural zeolites. The classification was first proposed by Meier and Olson in 1970 and has gained wide acceptance in the zeolite community. A framework type describes the connectivity of the tetrahedrally coordinated atoms of the framework in the highest possible symmetry. A three letter code is assigned to confirmed framework types by the Structure Commission of the IZA according to rules setup by the International Union of Pure and Applied Chemistry (IUPAC) Commission on zeolite nomenclature. As of January 2008, 175 unique zeolite frameworks have been identified, and over 40 naturally occurring zeolite frameworks are known.

Zeolite minerals species are not normally distinguished on the basis of the framework's Si/Al ratio. An exception is made in the case of Heulandite and Clinoptilolite, where Heulandite is defined as the zeolite minerals having the distinctive framework topology of Heulandite (HEU) with Si/Al ratio<4.0. Clinoptilolite is defined as the series with the same framework topology with the Si/Al ratio of ≥4.0. Depending on the extra cations present in the zeolite, the framework may have a suffix, for example Heulandite-Ca, Clinoptilolite-Na, and the like.

Clinoptilolite has been previously used as gas separation media. For example, U.S. Pat. No. 5,116,793 uses Clinoptilolite to separate molecules from a feed stream where one of the molecules has the tendency to adsorb strongly to the zeolite than other molecules. After the zeolite is loaded to a desired extent with the adsorbed component, the conditions of the zeolite are varied, for example in temperature or pressure, at which the zeolite desorbs the adsorbed component. The present invention uses the zeolite as a filtering media to separate Hydrogen from a syn-gas stream.

Clinoptilolite and Heulandite are normally mined because they are difficult to synthesize. There are very few examples where Clinoptilolite and Heulandite have been synthesized using seed crystals. Hence, economics are quite favorable for industrial use if the zeolite is mined rather than synthesized. There are mainly two reasons why mined zeolites have not been used for industrial applications. The first is the high level of impurities in the mined rocks, and the second is high macroporosity normally present in mined zeolites.

The first problem, i.e., impurities, is normally addressed via surface treatments, re-crystallization or ion-exchanging processes. This is undertaken after crushing the rock and before membrane fabrication. The second problem, macroporosity, is addressed by examining the mined rocks. There are very few mines in the world that yield mined zeolites with little to no macroporosity. For example, the clinoptilolite material obtained from Castle Mountain in Australia, Manery Creek mine in the Mt. Kobau area of British Columbia, Canada, and the Saint Cloud mine in New Mexico, USA appear to be unique deposits where extremely high geological pressures have been applied to essentially remove all the macroporosity from the source rocks. The bulk density of the zeolite rock is a good indicator of its macroporosity. A good indication that the zeolite rock has been naturally compressed to the point where the rock has essentially no macroporosity is when the bulk density of the zeolite rock is close to the crystal density of zeolite. The bulk density of rocks mined from Castle Mountain and Manery Creek mines are between 2.1 to 2.2 g/cc and the crystal density of Clinoptilolite is 2.2 g/cc.

Due to their well-defined pore structure, zeolite materials can be used for gas separation. A zeolite separation membrane must have both high flux and selectivity to be practical. Fabrication of practical zeolite membranes, including supported zeolite membranes, has long been a goal of separation and catalyst science. The source zeolite for membranes can either be natural or synthesized. Synthetic zeolites have a greater uniformity and purity than natural zeolites. Hence, synthetic zeolites are more commonly used industrial applications where purity is essential. For example, zeolites are widely used industrially as they exhibit shape-selective catalytic properties.

There are currently three general approaches for fabricating zeolite membranes. The first approach involves fabrication of zeolite membranes directly from natural deposits. In this case, rock fragments are machined into membrane structures, as shown in FIG. 9. These membrane structures have shown promising gas separation performance under laboratory conditions. However, this approach is limited by the quality and size of the starting rock material. These have high defect and crack density with macroporosity that make them unsuitable as membrane materials. Due to the nature of the process, they are form factor limited. Typically, zeolite membranes are fabricated or disposed upon a porous substrate. As such, the economics of scale up are also not favorable.

The second approach involves the fabrication of a continuous zeolite layer on a porous support. Currently, there is considerable prior art that describes the preparation of supported zeolite catalysts; specifically many different types of zeolites have been deposited on various supports. This is a "bottom-up" process that generally involves hydrothermal nucleation and growth of zeolite particles from a precursor solution under conditions amenable for the zeolite to form, as shown in FIG. 10. Zeolite particles nucleate and grow on the surface of the porous support. A continuous zeolite layer is eventually formed when the growing zeolite particles impinge upon each other.

This hydrothermal synthesis is normally done under high pressures, temperatures between 150° C. to 250° C., and time between 6 hours to one week. In some cases, interstitial voids remain between the zeolite particles that can lead to crack propagation when the membrane is mildly stressed. These voids act as defects that allow fluid flow to bypass the porosity in the zeolites, compromising the performance of the zeolite membrane. Conversely, extended growth periods can lead to thick layers that have low permeability and also lead to delamination failure of the membrane. The hydrothermal synthesis generally forms zeolite columns that are parallel to the growth direction, as shown in FIG. 10. Additionally, this hydrothermal process is difficult to economically scale-up.

A variation of this second approach is described by Choi et al., [*Ind. Eng. Chem. Res.,* 2007, 46, 7096-7106], where the membrane is fabricated in numerous layers. The composite membrane as shown in the schematic in FIG. 11 is comprised of MCM-22 zeolite that is grown hydrothermally and deposited alternately with mesoporous $SiO_2$ on a porous support. The deposition itself is not hydrothermal, but using evaporation induced the self-assembly process. Choi et al. attributed the improvement in gas selectivity to the oriented platelet morphology of MCM-22, as shown in FIG. 11 and the number of alternating layers. More layers help gas selectivity, but also decreases flux. Currently, this approach has only been demonstrated for large pore zeolite flakes in a mesoporous silica matrix. This approach is time consuming (expensive) and is prone to fail due to delamination, leading to poor manufacturability and high defect density. In addition, there are no known reports of structures comprising zeolite inclusions that span the entire thickness of the composite structure.

A third approach for the fabrication of zeolite membranes involves forming a mixed-matrix membrane, wherein zeolite particles are disposed in a continuous polymer matrix. Zimmerman et al., (Journal of Membrane Science 137 (1997) 145-154) fabricated a mixed-matrix zeolite-polymer membrane to separate oxygen and nitrogen. Membranes produced using this approach can exhibit superior gas separation performance, relative to a polymer membrane without the zeolite material. However, there are some key disadvantages of this approach. The gases have to diffuse through a continuous path of several zeolite particles. The flux will decrease significantly if the gases diffuse though the less-permeable polymer material, as shown in FIG. 12. In addition, the use of these membranes is limited to conditions the polymer membrane is capable of surviving. Further, similar to the second approach, there are no known reports of structures comprising zeolite inclusions that span the entire thickness of the composite structure.

As described above, zeolite membranes are currently limited by the ability to produce structures substantially free of the defects that compromise separation performance, but also possessing significant permeability to fluids. In addition, there is a need for structures that are amenable to scalable and low-cost manufacturing methods that can produce zeolite membranes with favorable economics, particularly for gas separation applications.

BRIEF DESCRIPTION

The zeolite of interest for the present invention belongs to the HEU framework. Two zeolites fall under this framework category, Heulandite and Clinoptilolite. The structural topology of the HEU framework consists of C2/m space group symmetry with oblate channels by ten-numbered (7.5×3.1 Å) parallel to the c-axis. There are additional eight-membered ring channels (4.7×2.8 Å) running parallel to [100] and [102] cross-link the former channels within (010), resulting in two-dimensional system parallel to (010) responsible for a layer-like structure.

Zeolite membranes comprising composite structures of particles derived from naturally occurring zeolite deposits embedded in a continuous inorganic matrix offer the possibility of simultaneously achieving good separation performance, along with favorable manufacturing economics. The ability to inexpensively manufacture well-controlled pore structures would open the market for ceramic membranes in markets not traditionally available.

We examine an unusual natural Clinoptilolite material, which has been compacted naturally over time into crystalline blocks containing essentially no macroporosity. When sectioned, this material behaves as a solid, continuous molecular sieve membrane. Untreated membranes sliced from this dense material were found to have as much as two times higher ideal selectivity for $H_2$ over $CO_2$ and $C_1/C_2$ hydrocarbons than would be predicted by Knudsen diffusion.

The invention solves the problem of fabricating a nearly defect-free zeolite membrane. The invention involves forming particles from a naturally-occurring dense clinoptilolite material, and forming a membrane comprising these particles embedded in a continuous non-silica inorganic matrix. The choice of the matrix material and the manner in which it is deposited allows the formation of a dense continuous matrix at a low enough temperature to avoid thermal degradation of the zeolite material.

In some embodiments, the invention is a membrane structure that is distinct from those fabricated by any of the known approaches for zeolite fabrication. The structure differs from those produced by hydrothermal methods in that the zeolite particles that are sealed by the non-silica, inorganic matrix span the entire thickness of the free-standing membrane. Although the Choi reference describes a process in which a free-standing membrane comprises zeolite particles in an inorganic matrix of silica, the zeolite particles in the Choi membrane do not span the entire thickness of the free-standing membrane. In other words, the spacing between zeolite particles and their relative size distribution in the free-standing zeolite membrane of the invention cannot be fabricated using hydrothermal processes. As result, the free-standing zeolite membrane of some embodiments of this invention provides a continuous gas transport path from one side of the membrane to the other. The method for fabrication also reduces the time required to produce the supported zeolite membrane of the invention.

In addition, the use of an inorganic matrix distinguishes the invention from previous mixed matrix zeolite membrane efforts. The use of an inorganic matrix, in lieu of a polymer matrix, enables higher temperature operation of the membrane, particularly for gas separation applications such as those encountered in the energy and chemical industries. On the other hand, typical approaches to thermally sinter matrix material are far above the sensitivity of the zeolite particles, and are therefore damaging to the gas selective properties of the zeolite particles.

In one aspect, a method for fabricating a free-standing zeolite membrane comprises:

mixing an optional inorganic binder and zeolite particles to form a dry mixture;

forming the dry mixture into a green body; and sintering the green body at a sufficiently low temperature so as to prevent damage to the gas selective properties of the zeolite particles.

In another aspect, a free-standing zeolite membrane comprises zeolite particles of the Heulandite framework dispersed within an inorganic binder, wherein the zeolite particles have a particle size less than about 200 microns, and wherein the naturally-occurring zeolite particles comprise about 60% to about 100% by volume of the free-standing zeolite membrane.

In yet another aspect, a method for fabricating a zeolite membrane coated on a support structure, comprises:

mixing an inorganic binder, a sacrificial binder and zeolite particles to form a slurry;

coating the slurry onto a support structure;

drying the slurry under controlled temperature and humidity conditions; and sintering the slurry at a sufficiently low temperature so as to prevent damage to the gas selective properties of the zeolite particles.

In yet another aspect, a zeolite membrane coated on a support structure comprises zeolite particles of the Heulandite framework dispersed within an inorganic binder, wherein the zeolite particles have a particle size less than about 200 microns, and wherein at least about 10% of the zeolite particles span an entire thickness of the zeolite membrane.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
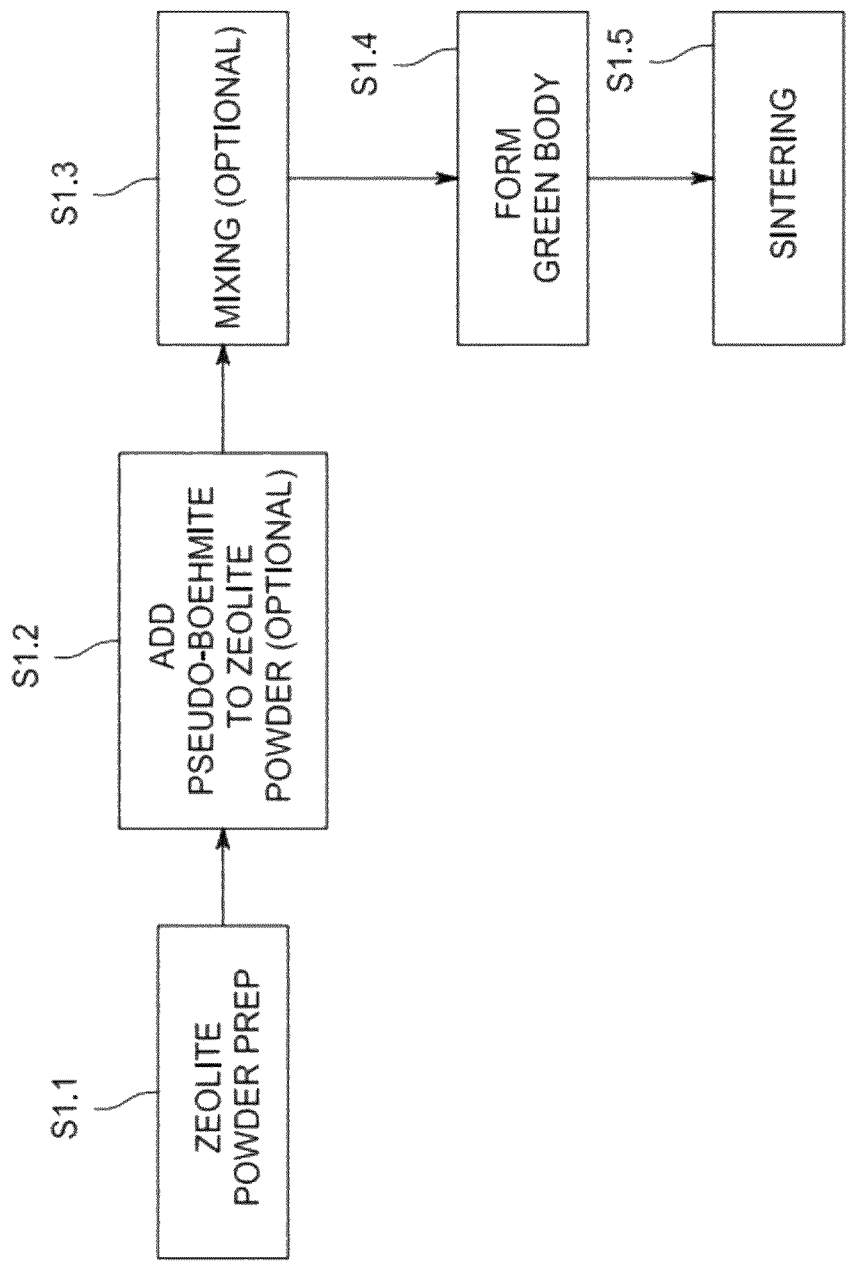
FIG. 1 is a flow chart of the method of fabricating a zeolite membrane according to the invention.

In general, the zeolite membrane of the invention is fabricated from a dry powder or an aqueous-based slurry that can be either free-standing or flow coated onto a porous support structure, such as ceramic, and the like.

In one embodiment, the slurry is a multi-component colloidal sol gel precursor. The slurry is designed to be used in a pump feed-able stock solution that can either be deposited on planar surfaces, tape cast into sheet form or feed into the inside diameter of tube structures. The ratio of the precursors is critical to determine or set the final properties of the matrix structure. Once the composite membrane is thermally set or sintered, the resulting matrix should not contain any open porosity or interconnected porosity such that the flux through the matrix is far lower than the zeolite particles. In addition, the resulting composite membrane does not contain any significant defects, thereby allowing a primary alternative path for media separation.

The components of the slurry are as follows: a sacrificial binder, an optional gamma-Alumina powder and/or alpha-Alumina powder, a boehmite sol, and zeolite particles. The zeolite particles provide the high selectivity for gas and/or liquid transport through the membrane. The boehmite sol (Alumina precursor) and the gamma-Alumina powder and/or alpha-Alumina powder is a permanent, inorganic binder that incorporates the zeolite particles in a thin film membrane structure. Using gamma-Alumina powder or alpha-Alumina powder is optional, and hence not always required. Therefore, the essential components of the slurry are the sacrificial binder, the boehmite sol, and the zeolite particles.

The sacrificial binder enables continuous flexible membranes, and is removed (sacrificed) during the final heat treatment or sintering. The sacrificial binder can be any acceptable sacrificial binder known in the art. One example of a sacrificial binder is a solution of an organic binder, such as such as polyvinyl alcohol (PVA), polyethylene glycol (PEG), methyl, ethyl and propyl, hydroxypropylcelluloses, and the like.

The gamma-Alumina powder seals the interstitial voids between the zeolite particles, thereby allowing the composite membrane to exhibit properties dominated by entitlement associated with the zeolite particles. Instead of gamma-Alumina, alpha-Alumina can also be used. Many types of pure alpha-Alumina powders are commercially available. Alternately, alpha-Alumina can be obtained by heating the reactive gamma-Alumina to 1100° C. However, if alpha-Alumina is used as a matrix material, it is often preferable to use boehmite sol, in order to aid in sintering the composite membrane material at less than 600° C.

The gamma-Alumina is readily available commercially and is frequently used as catalysts and catalyst supports. The term "gamma-Alumina" as used herein refers to the intermediate forms of alumina encountered during the thermal decomposition of the hydrated Alumina and sometimes during that of other aluminum compounds before the appearance of alpha alumina, which constitutes the stable phase above 1100° C. The gamma-Alumina may contain minor proportions of other materials without departing from the scope of the invention such as, for example, silica and carbon. Prior to use, the gamma-Alumina should be substantially free of adsorbed water, i.e. "substantially dehydrated." The residuum of chemically bound water, i.e., water of hydration, is not harmful to the process of this invention. The adsorbed or free water is removed by heating the gamma-Alumina at temperatures from about 200° C. to about 900° C. prior to contact with the zeolite particles. Any environment that will provide for drying is suitable, such as air, vacuum, inert gas such as nitrogen, and the like.

It is important to note the following considerations for the composition of the slurry. The sole purpose of the sacrificial binder is to form a film and act as an intermediate structural aid, and as such, does not need to exceed about 2% of the slurry, by mass. The sacrificial binder of choice is a PVA to lend stability to the slurry. However, other sacrificial binders are within the scope of the invention. The boehmite sol is an acid stabilized sol with a particle size less than about 1 micron (d90). The boehmite sol contains about 5% to about 10% by volume in stock form, and once added to the slurry, the boehmite sol provides about 2% to about 6% of the available source alumina in the slurry. The optional gamma-Alumina powder has a particle size of about 1 to about 4 microns, and is added as about 10% to about 30% of the slurry, by volume.

Referring now to FIG. 1, a method for fabricating the free-standing zeolite membrane, according to some embodiments, will now be described. First, a dry powder of zeolite particles is prepared in Step S1.1. In Step S1.1, crushing a naturally occurring zeolite source rock into zeolite particles that are smaller than d90<200 micron creates the dry powder of zeolite particles. The source rock may comprise, for example, naturally-occurring zeolite of the Heulandite framework (HEU framework), such as Heulandite, Clinoptilolite, or a combination of both. The source rock can be crushed in a shatter box, jaw crusher, and the like. Then, after classification, any zeolite particles greater than 200 microns can be further reduced in size to 200 microns or less using well-known dry and wet milling techniques. Dry milling techniques include, but are not limited to, hammer milling, jet milling, dry ball milling, vibratory milling, cryogenic milling, and the like. Wet milling techniques include, but are not limited to, wet ball milling, attritor milling, vibratory milling, and the like.

As described above, it is generally known to use zeolite as a membrane material for gas separation, mainly through hydrothermal in-situ crystallization on porous supports. For example MFI framework zeolites have been widely used as zeolite membranes for gas separation. One most commonly used zeolite that belongs to the MFI framework is ZSM-5. The structural topology of the MFI framework zeolite consists of Pnma space group symmetry with pore network of ten-numbered rings consisting of interconnected straight channels of 5.3×5.6 Å openings and zigzag channels of 5.1× 5.5 Å openings. Hence, the smallest pore opening in an MFI type zeolite is 5.1 Å, whereas the smallest pore opening in HEU framework is 2.8 Å. The membrane for the invention should be capable of separating Hydrogen and carbon dioxide effectively. The molecular diameter of Hydrogen and carbon dioxide is 2.8 Å and 3.3 Å, respectively. In order to effectively separate the two gases of interest, HEU is better suited than MFI type framework. In fact, the HEU framework is the most suited framework of any zeolite framework to separate Hydrogen and carbon dioxide.

Next, an optional dry inorganic binder may be added to the dry powder of zeolite particles in Step S1.2. The inorganic binder is commercially available. The invention can use a variety of different types of inorganic binders. For example, the inorganic binder comprises alpha-Alumina powder, gamma-Alumina powder, or a combination of both. The inorganic binder may also comprise an inorganic oxide of alumina, MgO, silica, ceria, $ZrO_2$, titania, titania-silicates, and any combination thereof.

Then, the zeolite powder and the pseudo-boehmite powder are mixed to ensure a homogeneous mixture in Step S1.3. For example, the powders can be mixed using any suitable means, such as roll mill, and the like.

In an alternate method, the pseudo-boehmite powder is not added to the zeolite powder in Step S1.2, and therefore no mixing of the zeolite powder and pseudo-boehmite powder is required in Step S1.3, and the method proceeds directly from Step S1.1 to Step 1.4.

Next, the mixed dry powder is formed into a green body by using techniques that are well-known in the art in Step S1.4. It will be appreciated that the invention is not limited by the particular technique used to form the green body, and that the green body can be formed by casting, coating, pressure casting, pressing, and the like. In one embodiment, for example, the green body is formed by uniaxially pressing the mixed dry powder in a 1.25 inch die at a pressure of about 4000 psi (27.57 Mpa) for about 30 seconds, and then cold isostatic pressing at a pressure of about 40000 psi (275 Mpa).

Then, the green body (zeolite or zeolite and the optional pseudo-boehmite) is sintered at Step S1.5. The sintering of the green body causes the green body to have sufficient strength as a free-standing membrane. However, it is important to note the sintering temperature is sufficiently low so as to prevent damage to the gas selective properties of the zeolite particles, i.e. the sintering temperature is usually less than about 600° C. By contrast, typical approaches to thermally treat matrix material are far above the sensitivity of the zeolite particles, and are therefore damaging to the gas selectivity performance of the zeolite particles. The thermal treatment is complete when the porosity of the pseudo-boehmite is significantly less than the cage structure size of the zeolite particles (3-5 Angstroms).

Figure 2:
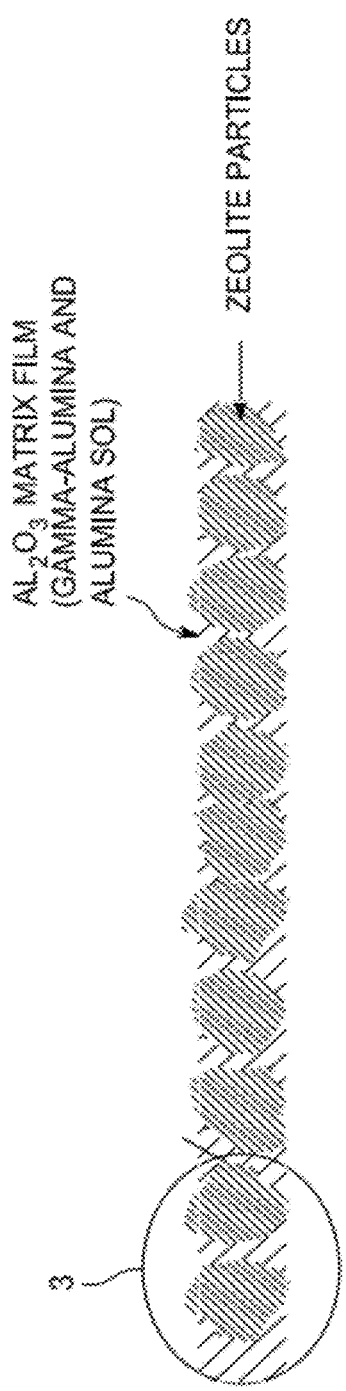
FIG. 2 is a schematic of the zeolite membrane comprising zeolite particles, gamma-Alumina and $Al_2O_3$ (boehmite) sol using the method of the invention shown in FIG. 1.
Figure 3:
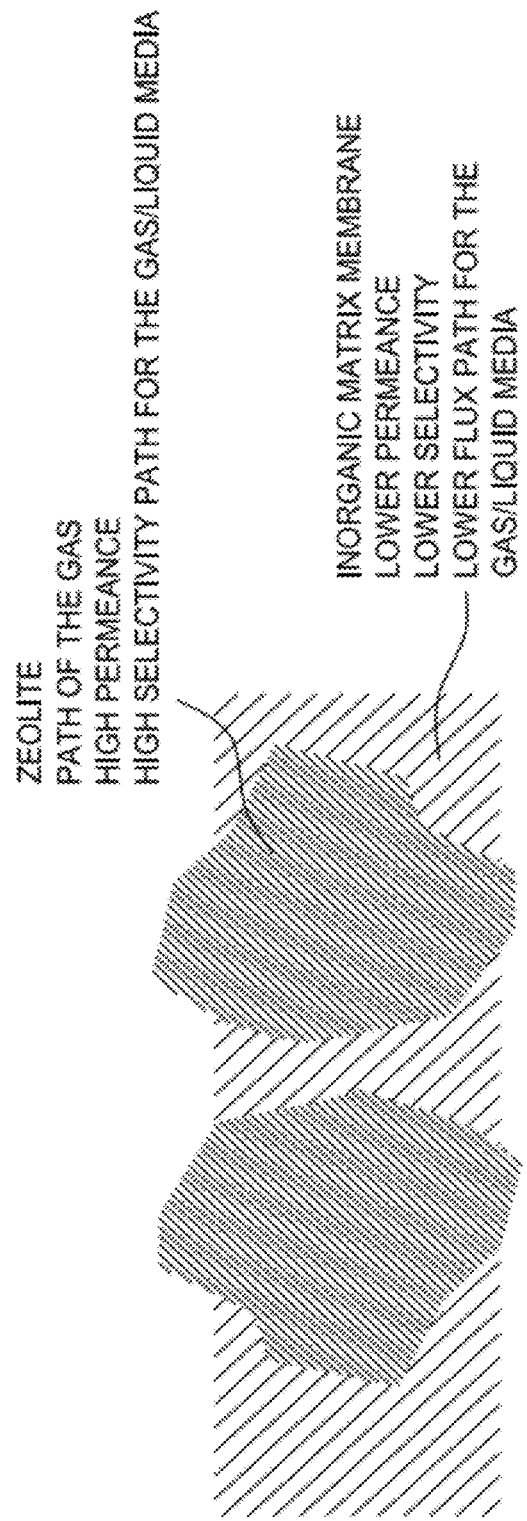
FIG. 3 is an enlarged schematic of the zeolite membrane shown in FIG. 2.

FIGS. 2 and 3 show a schematic representation of the free-standing zeolite membrane fabricated using the method of the invention described in FIG. 1. As shown, the free-standing zeolite membrane forms a continuous membrane structure with a thin film of the zeolite particles interspersed within an inorganic matrix material. In one embodiment, the zeolite particles constitute about 60% to about 100% by volume of the free-standing zeolite membrane. In other words, the inorganic oxide matrix, if used, constitutes less than about 40% by volume of the zeolite membrane. The free-standing zeolite membrane has a thickness less than about 1 cm, and preferably less than about 5 mm. The zeolite particles span the entire thickness of the membrane and provide a high permeance and a high selectivity path for the flow of a selected fluid (gas/liquid) to pass therethrough, while the inorganic matrix material ($Al_2O_3$ matrix film) provides a low permeance and a low selectivity path (high resistance) for the selected fluid. Currently, no prior art methods are capable of fabricating a free-standing zeolite membrane in which the zeolite particles span the entire thickness of the membrane.

Figure 4:
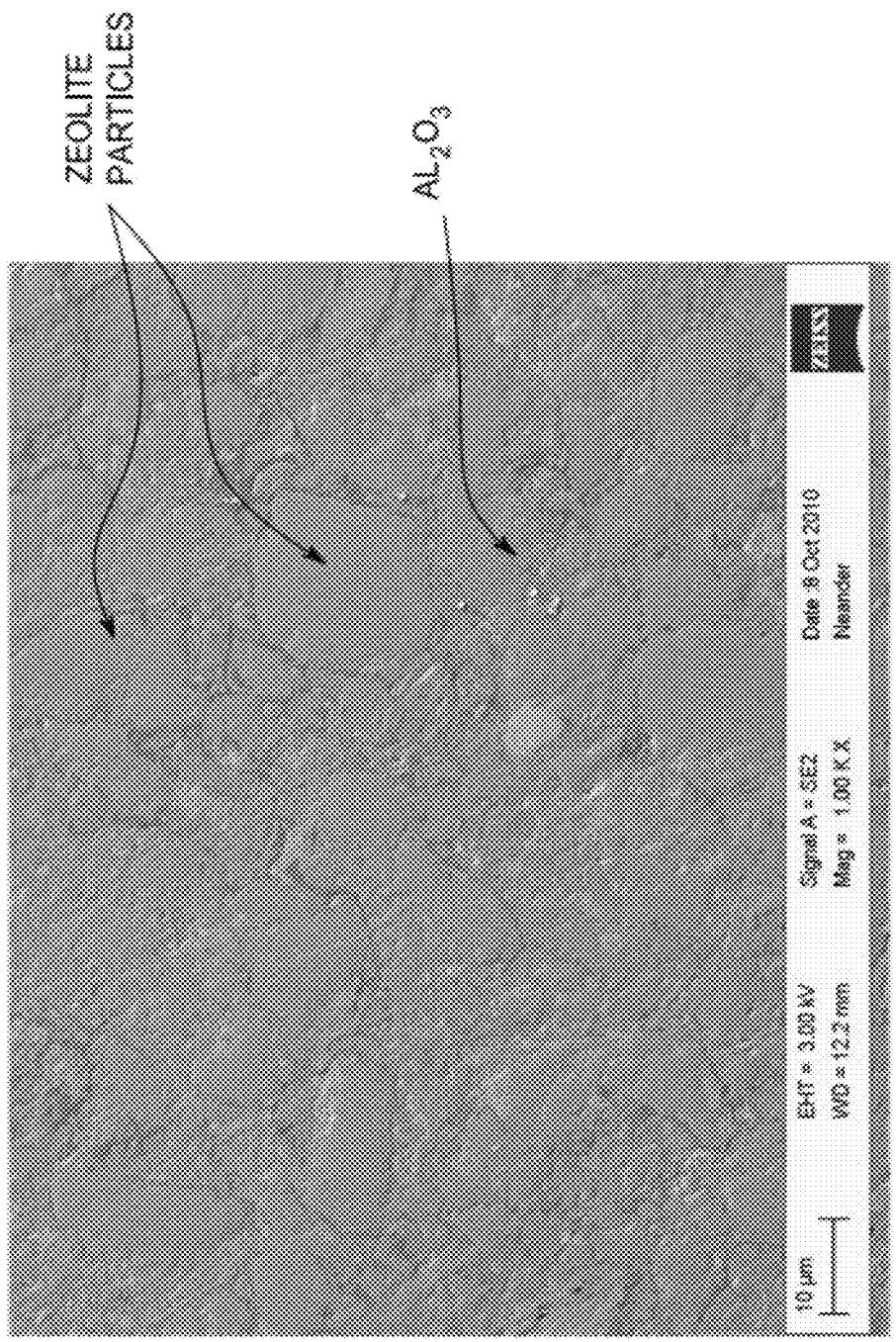
FIG. 4 is field emission scanning electron micrograph (FESEM) at a magnification of 1000× of the surface of the free-standing zeolite membrane fabricated using the method of the invention shown in FIG. 1.

FIG. 4 is a field emission scanning electron micrograph (FESEM) micrograph at a magnification of 1000× of the surface of the free-standing zeolite membrane fabricated using the method of the invention of FIG. 1. An examination of the FESEM shows that the zeolite membrane forms a continuous and dense membrane structure.

The zeolite membrane described above can also be used as a coating for a porous support structure, such as ceramic, and the like. The supported composite membrane of the invention is fabricated from an aqueous-based, slurry system that can be flow coated onto the support structure. In general, the slurry system is a multi-component colloidal sol gel precursor. The slurry system is designed to be used in a pump feed-able stock solution that can either be deposited on planar surfaces, tape cast into sheet form or feed into the inside diameter of tube structures. The ratio of the precursors is critical to determine or set the final properties of the matrix structure. Once the alumina matrix is thermally set or sintered, the resulting matrix should have a resulting pore structure significantly smaller than that of the zeolite particles such that the flux through the alumina matrix is far lower than zeolites. In addition, the resulting matrix may not contain any significant defects allowing a primary alternative path for gas flow.

Figure 5:
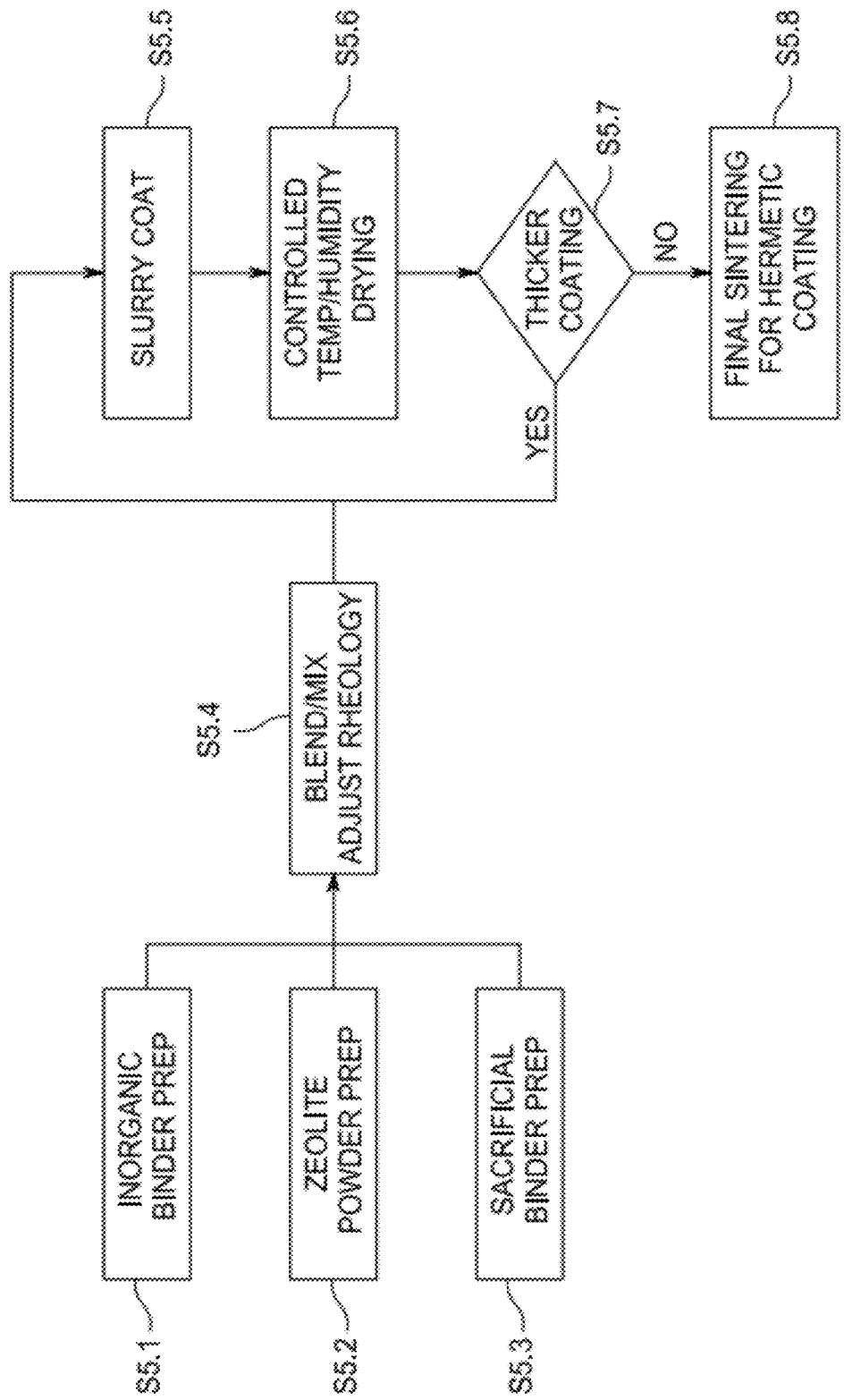
FIG. 5 is a flow chart of the method of fabricating a coated zeolite membrane on a support structure according to a method of the invention.

Referring now to FIG. 5, a method of fabricating a zeolite membrane coated on a support structure, according to some embodiments of the invention, will now be described. In general, there are three basic components of the slurry system: 1) the naturally-occurring zeolite particles, 2) an inorganic binder, such as a boehmite sol (i.e., gamma-Alumina precursor), and the like, and 3) a sacrificial binder, such as polyvinyl alcohol (PVA), polyethylene glycol (PEG), and the like, that is mixed with the inorganic binder. The inorganic binder is prepared in Step S5.1, the naturally-occurring zeolite particles are prepared in Step S5.2 (similar to Step S1.1), and the sacrificial binder is prepared in Step S5.3.

The zeolite particles provide the high permeance and high selectivity of the selected fluid through the membrane, such as hydrogen, and the like. The sacrificial binder is necessary during processing to enable continuous flexible films, and is removed as part of the final heat treatment. The sacrificial binder can be any acceptable sacrificial binder known in the art. One example of a sacrificial binder is a solution of an organic binder, such as polyvinyl alcohol (PVA), polyethylene glycol (PEG), methyl, ethyl and propyl hydroxypropyl celluloses, and the like, and an inorganic binder, such as boehmite (Alumina sol). Optionally, the gamma-Alumina powder seals the interstitial voids between the zeolite particles, thereby allowing the composite membrane to exhibit properties dominated by entitlement associated with the naturally-occurring zeolite particles. In the absence of the optional gamma-Alumina powder, the boehmite sol (Alumina sol) fills the interstitial voids. Instead of the optional gamma-alumina, an optional alpha-alumina can also be used. Many types of pure alpha-aluminas are also available commercially for this invention. Alternately, alpha-alumina can also be obtained by heating the reactive gamma-alumina to about 1100° C. as a suitable matrix material. However, if alpha-alumina is used as a matrix material, boehmite sol should be used in order to aid in sintering the membrane composite material below about 600° C.

The gamma-Alumina used in the process to prepare the fluid selective zeolite membrane of the invention is readily available commercially and is frequently used as a catalyst and a catalyst support. The term "gamma-Alumina" as used herein refers to the intermediate forms of alumina encountered during the thermal decomposition of the hydrated Alumina and sometimes during that of other aluminum compounds before the appearance of alpha alumina, which constitutes the stable phase above 1100° C. The gamma-Alumina may contain minor proportions of other materials without departing from the scope of the invention such as, for example, silica and carbon. Prior to use, the gamma-Alumina should be substantially free of adsorbed water, i.e. "substantially dehydrated." The residuum of chemically bound water, i.e., water of hydration, is not harmful to the process of this invention. The adsorbed or free water is removed by heating the gamma-Alumina at temperatures from about 200° C. to about 900° C. prior to contact with the zeolite particles. Any environment that will provide for drying is suitable, such as air, vacuum, inert gas such as nitrogen, and the like.

Next, the boehmite sol (inorganic binder) and a sacrificial binder are added to the zeolite particles to form a slurry and mixed to ensure a homogeneous mixture in Step S5.4. The rheology of the slurry is typically shear-thinning with a finite yield stress. This ensures that during coating (higher shear rates), the slurry flows to obtain a homogeneous coating. However, when the coating is stopped (shear rate is 0), the viscosity of the slurry increases, and hence the coating will cease to flow.

It is important to note the following considerations to the composition of the slurry. Usually, the sole purpose of the sacrificial binder is to form a film and act as an intermediate structural aid, and as such, does not need to exceed about 2% mass on a dry basis of the slurry. The sacrificial binder of choice is a PVA to lend stability to the slurry. However, other sacrificial binders are within the scope of the invention. The boehmite sol is an acid stabilized sol with a particle size less than 1 micron. The boehmite sol contains about 5 to about 10% by volume in stock form, and once added to the slurry, the boehmite sol provides about 2% to about 6% of the available source alumina in the slurry by volume. The optional gamma-Alumina powder has a particle size of about 1 to about 4 microns, and if added, constitutes about 10 to about 30% of the slurry, by volume. The zeolite particles should make up at least 10% or greater of the slurry, by volume. This amount of zeolite particles in the slurry should be sufficient such that the zeolite in the sintered coating (i.e., composite membrane) provides the dominant selective effect.

A coating of slurry having a substantially uniform thickness is applied to the surface of a support structure by either pumping in a controlled process or depositing on the surface using any well-known means in the art in Step S5.5. The support structure can be made of an oxide ceramic, alumina, $ZrO_2$, YAG (Yttrium aluminum garnet, $Y_3Al_5O_{12}$), Spinel (Magnesium aluminate, $MgAl_2O_4$), $SiO_2$, $TiO_2$, Mullite (Aluminum silicate $3Al_2O_3 2SiO_2$ or $2Al_2O_3 SiO_2$), glass, and combinations thereof. The coating can be deposited on planar surfaces, tape cast into sheet form or fed into the inside diameter of tube structures. The thickness of the coating can be between about 0.5 microns to about 80 microns, which implies that the maximum size of the naturally-occurring zeolite particles can be between about 0.5 micron and about 80 micron. Once applied, the slurry is dried for several hours in a high humidity chamber under controlled conditions in Step S5.6.

In Step S5.7, a determination is made as to whether the coating has the desired thickness. If the coating does not have the desired thickness, then steps S5.5 and S5.6 are repeated until the desired thickness is achieved. Once the desired thickness is achieved, the coating is thermally treated to sinter the structure to form the supported composite membrane structure in Step S5.8.

During sintering, the boehmite sol (Alumina) and the optional gamma-Alumina form a "dense" Alumina matrix film that incorporates the zeolite particles in a supported composite zeolite membrane structure. It is important to note the sintering temperature is sufficiently low so as to prevent damage to the zeolite particles. For example, the sintering temperature is less than about 600° C. The thermal treatment converts the boehmite sol to finely dispersed gamma-$Al_2O_3$. The thermal treatment is complete when there are no interconnected pores or open porosity in the Alumina matrix. Typically for ceramic sintering when the density of the structure is between 95-97% dense relative to theoretical, there is no open porosity. The key is to ensure that the gas permeates only through the zeolite and not the alumina matrix.

The design of the matrix material and sol gel approach allows thermal sintering to a dense support structure at a low enough temperature to protect the zeolite material. On the other hand, typical approaches to thermally treat matrix material are far above the sensitivity of the zeolite particles, and are therefore damaging to the gas selectivity performance of the zeolite particles.

Figure 6:
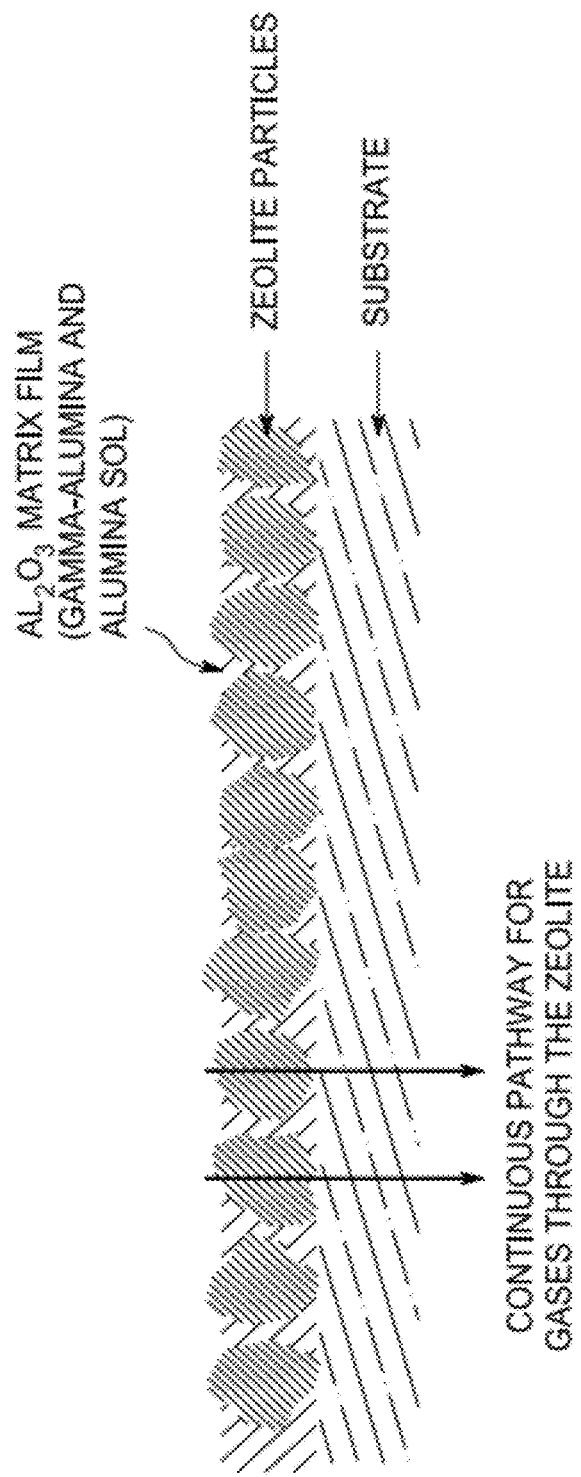
FIG. 6 is a schematic of the zeolite membrane comprising zeolite particles, gamma-Alumina and $Al_2O_3$ sol that is supported by a substrate using the method of the invention.

FIG. 6 shows a schematic representation of the supported composite zeolite membrane structure fabricated using the method of the invention described in FIG. 5. As shown, the supported composite zeolite membrane exhibits a number of distinct characteristics.

First, the sacrificial binder is removed during sintering of the supported composite zeolite membrane. In addition, the boehmite sol (Alumina) and gamma-Alumina form a "dense" alumina matrix film that incorporates the zeolite particles in a composite membrane. As a result, the zeolite particles are directly attached to and integral with the gamma-Alumina and the surface of the substrate. In this respect, the composite membrane fabricated by the method of the invention is distinct from those prior art membranes that include an intermediate "glue" or binder in the finished product. The membrane is engineered such that the zeolite has higher flux, higher permeance, and higher selectivity that span the entire thickness i.e., they are not interconnected to form a continuous pathway for separation.

The essentially continuous nature of the composite membrane is due to the morphology, shape and orientation of the zeolite particles that enables the particles to be densely packed together from the sintering process. This "essentially continuous" nature does not mean that the composite membrane is perfect and completely absent of voids, but it is intended to include membranes having a small number of voids or defects. However, the composite membrane of the invention is sufficiently continuous so as not to require any post-treatment or reparation layer. Preferably, the composite membrane is defect-free and exhibits less than about 1%, by volume, of voids, a void being defined as space between adjacent zeolite particles larger than 40 Angstrom. In a preferred embodiment, the composite membrane exhibits less than about 0.1%, by volume, of voids.

Second, the composite membrane is usually comprised of a single layer of zeolite particles that is less than about 50 μm thick, and more preferably less than about 25 μm thick. As a result, the composite membrane of the invention is capable of higher fluxes, while maintaining selectivity and stability.

Third, a substantial amount of naturally-occurring zeolite particles span the entire thickness of the coating. For example, at least about 10% of the naturally-occurring zeolite particles span the entire thickness of the coating. Currently, no prior art methods are capable of fabricating a free-standing zeolite membrane in which the zeolite particles span the entire thickness of the membrane Fourth, the zeolite particles dispersed within the inorganic matrix occupy at least 60% to about 95% by volume of the supported zeolite membrane, and the inorganic binder occupies about 5% to about 40% by volume.

Figure 7:
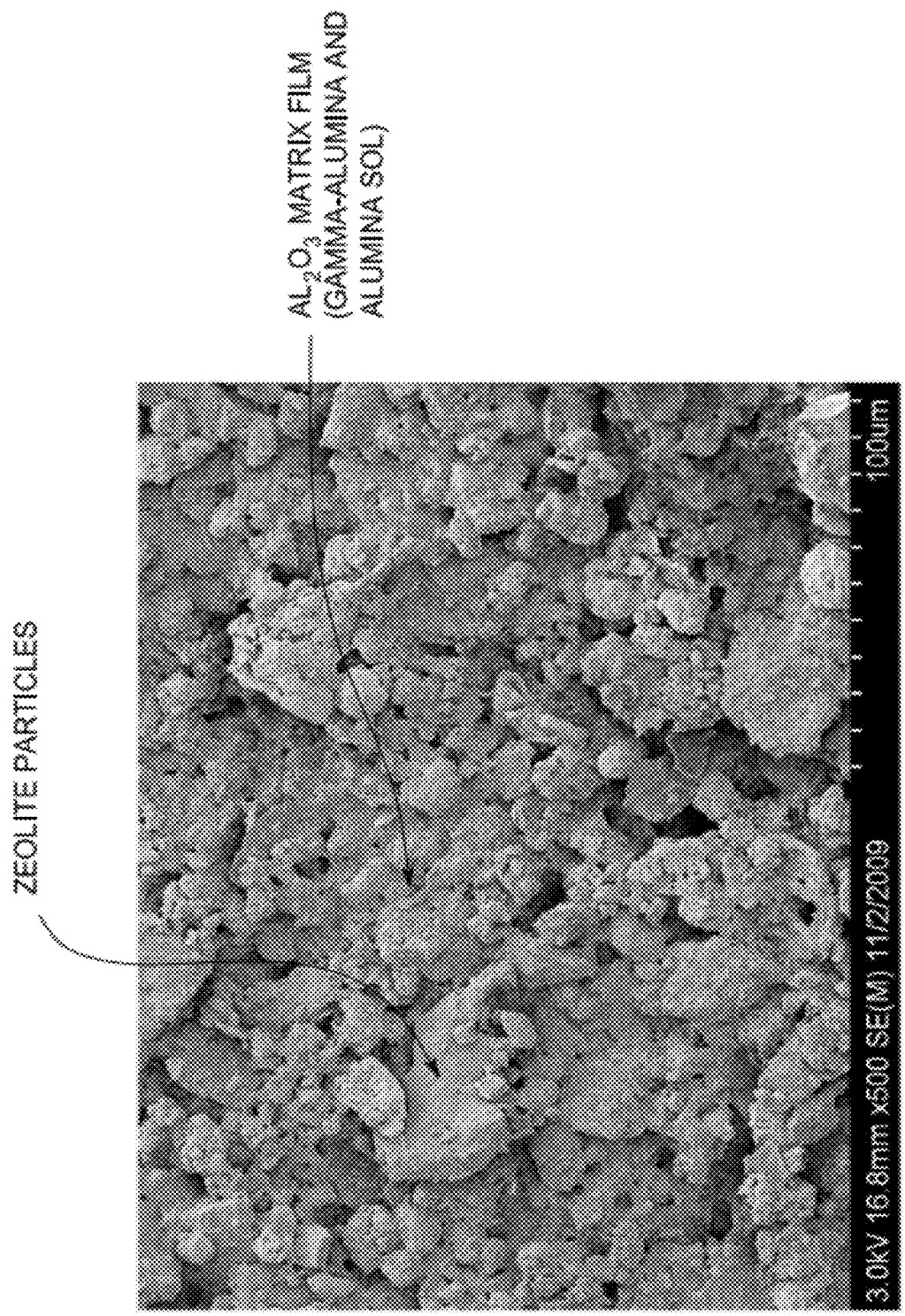
FIG. 7 is field emission scanning electron micrograph (FESEM) at a magnification of 500× of the surface of the coated zeolite membrane fabricated using the method of the invention shown in FIG. 5.

FIG. 7 is a field emission scanning electron micrograph (FESEM) micrograph at a magnification of 500× of the surface of the supported composite membrane fabricated using the method of the invention. An examination of the SEM shows that the composite membrane completely and densely covers the support structure and forms a continuous composite membrane.

Figure 8:
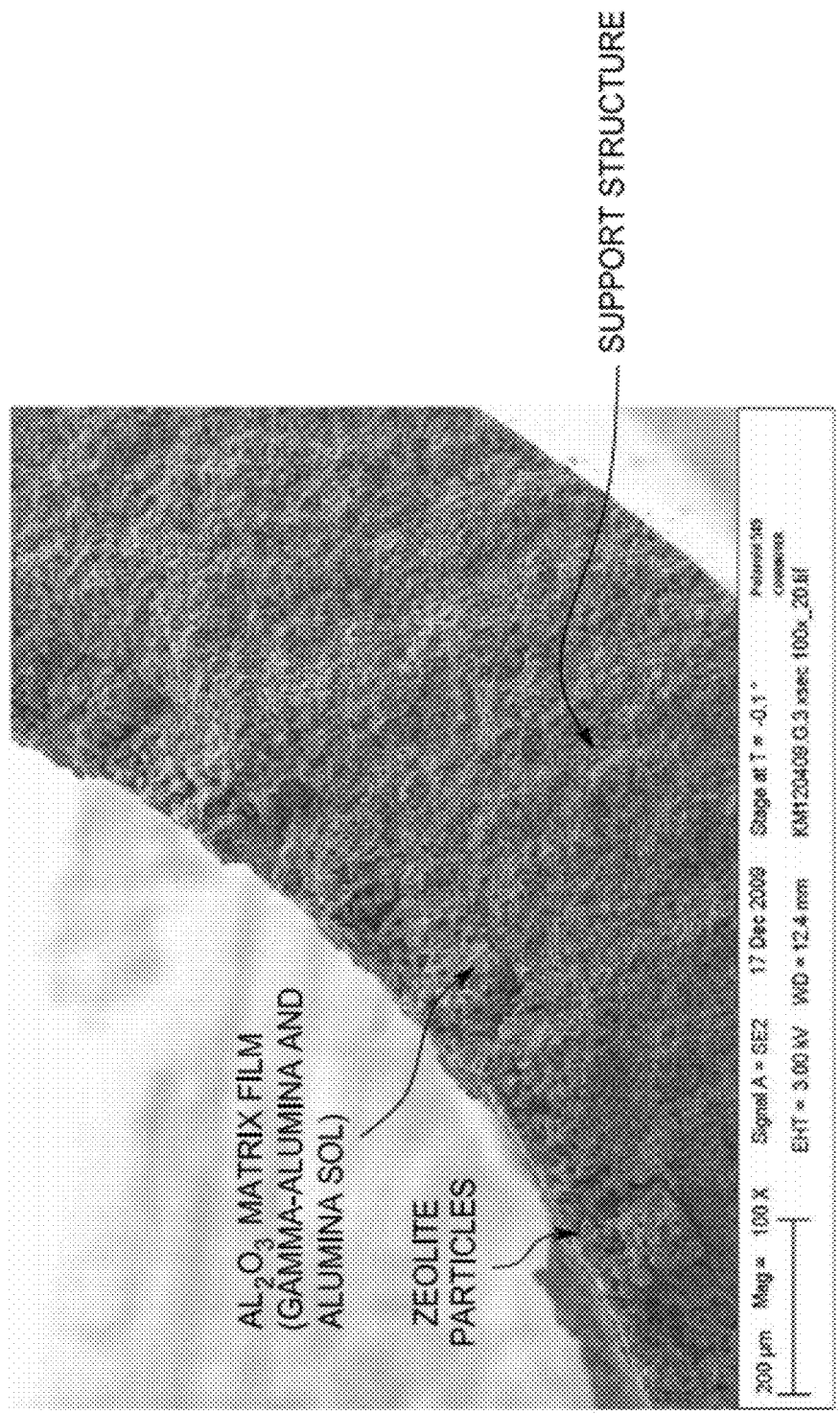
FIG. 8 is a field emission scanning electron micrograph (FESEM) at a magnification of 100× of a cross-section of the supported composite membrane fabricated using the method of the invention shown in FIG. 5.
Figure 9:
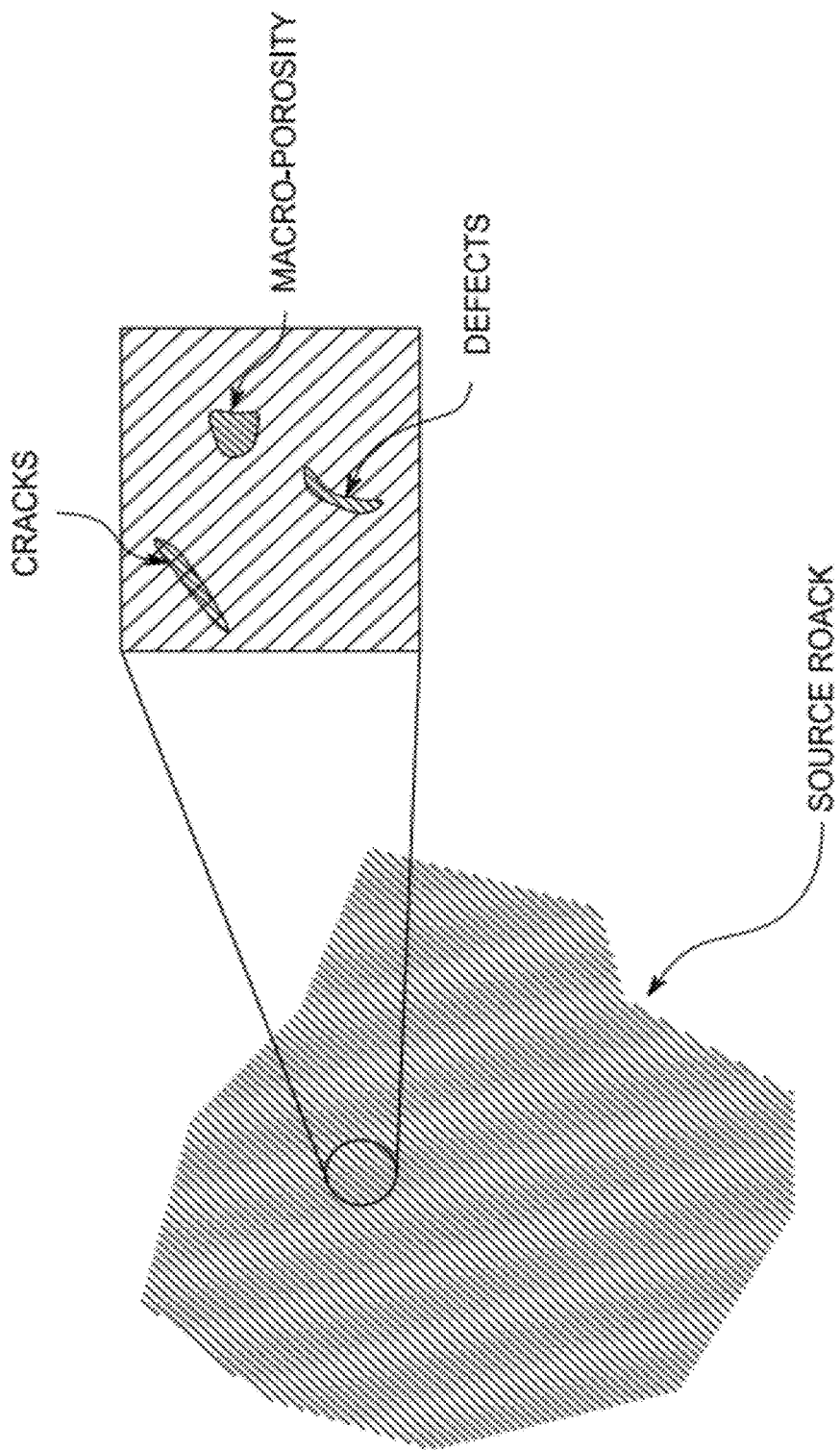
FIG. 9 is a schematic of a conventional approach of fabricating a zeolite membrane directly from natural deposits.
Figure 10:
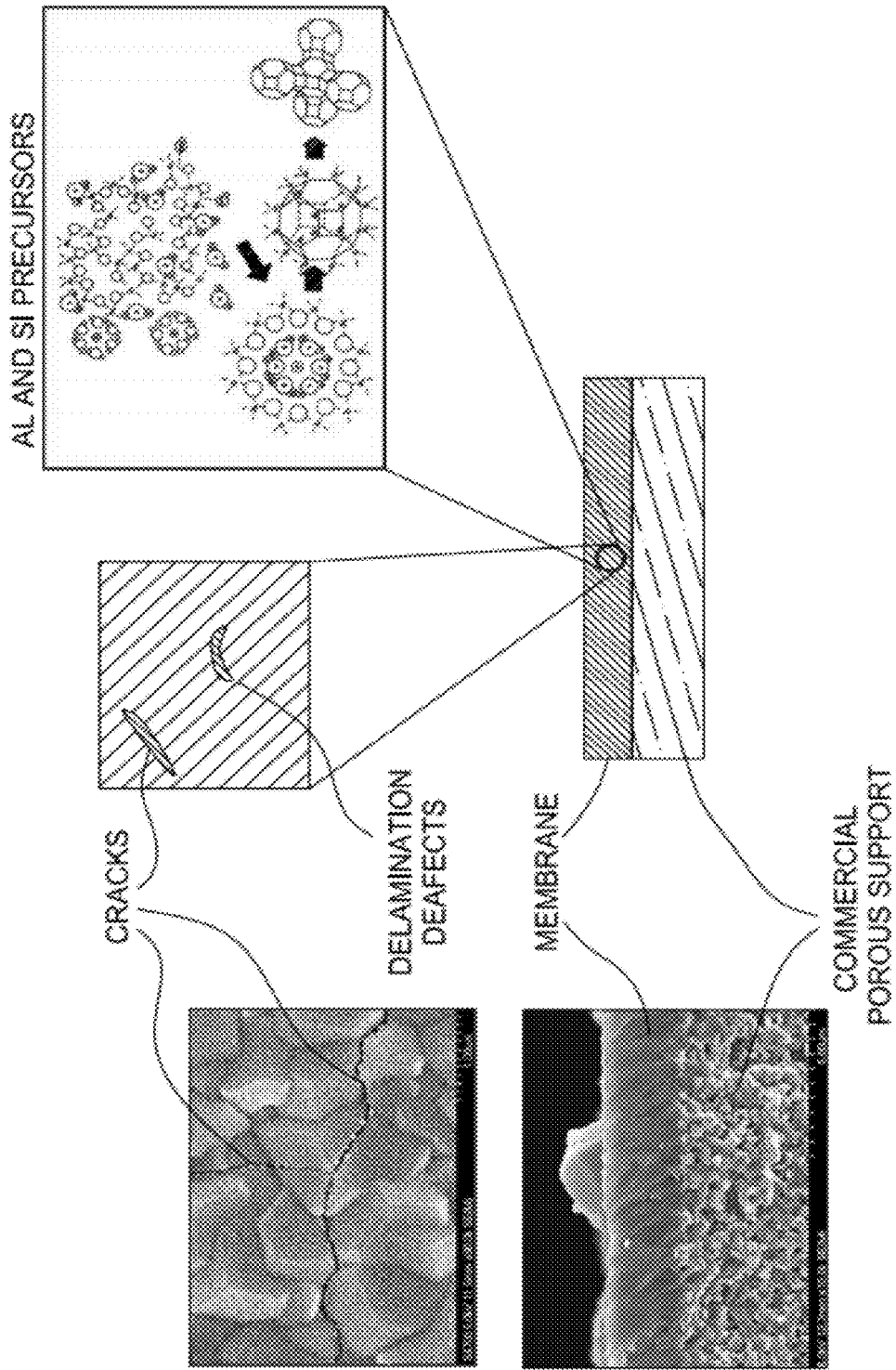
FIG. 10 is a schematic of a conventional approach of fabricating a zeolite membrane comprising a continuous zeolite layer on a porous support.
Figure 11:
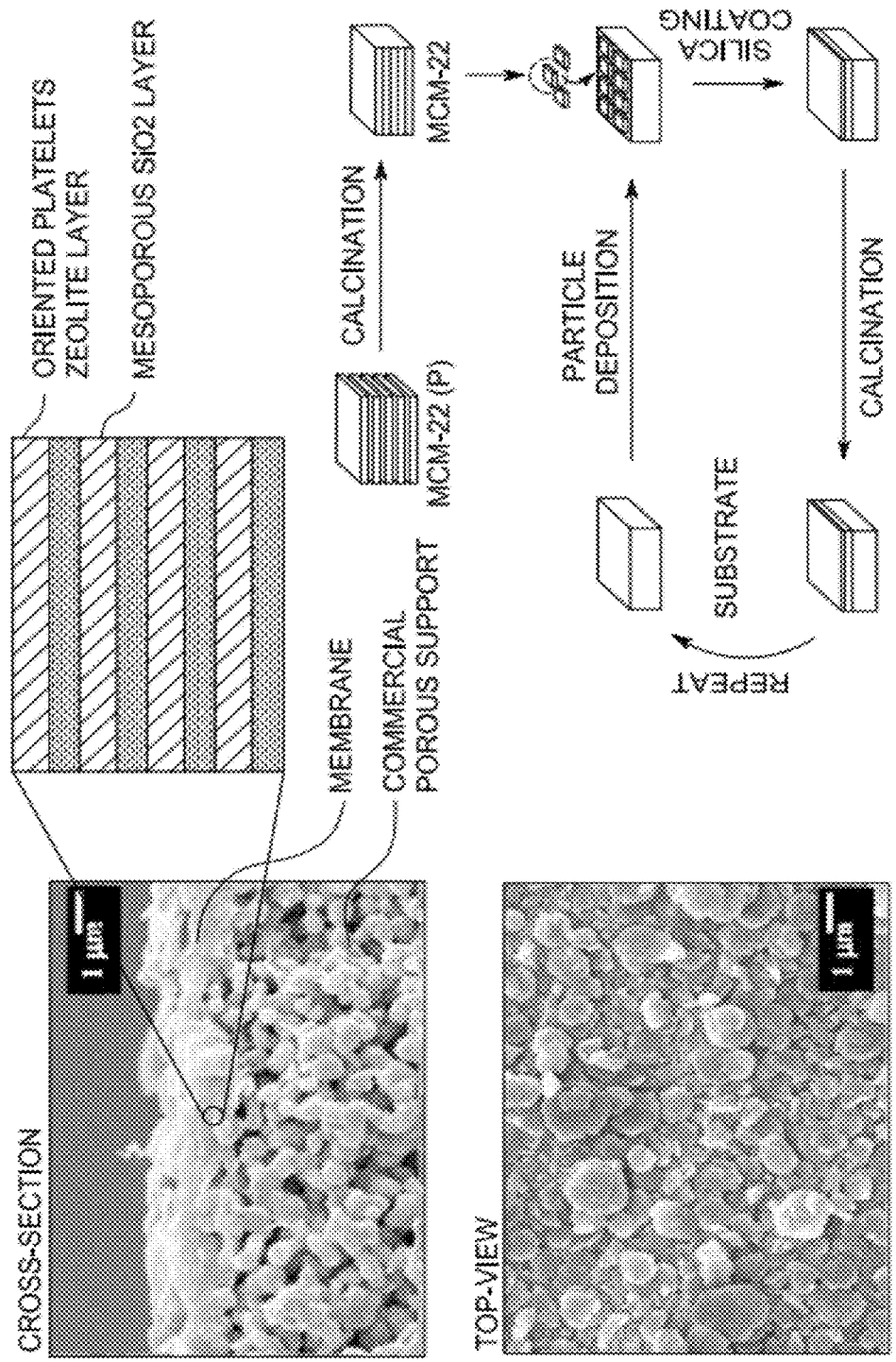
FIG. 11 is a schematic of a conventional approach of fabricating a zeolite membrane using MCM-22 zeolite that is grown hydrothermally and deposited in alternate layers with mesoporous $SiO_2$ on a porous support.
Figure 12:
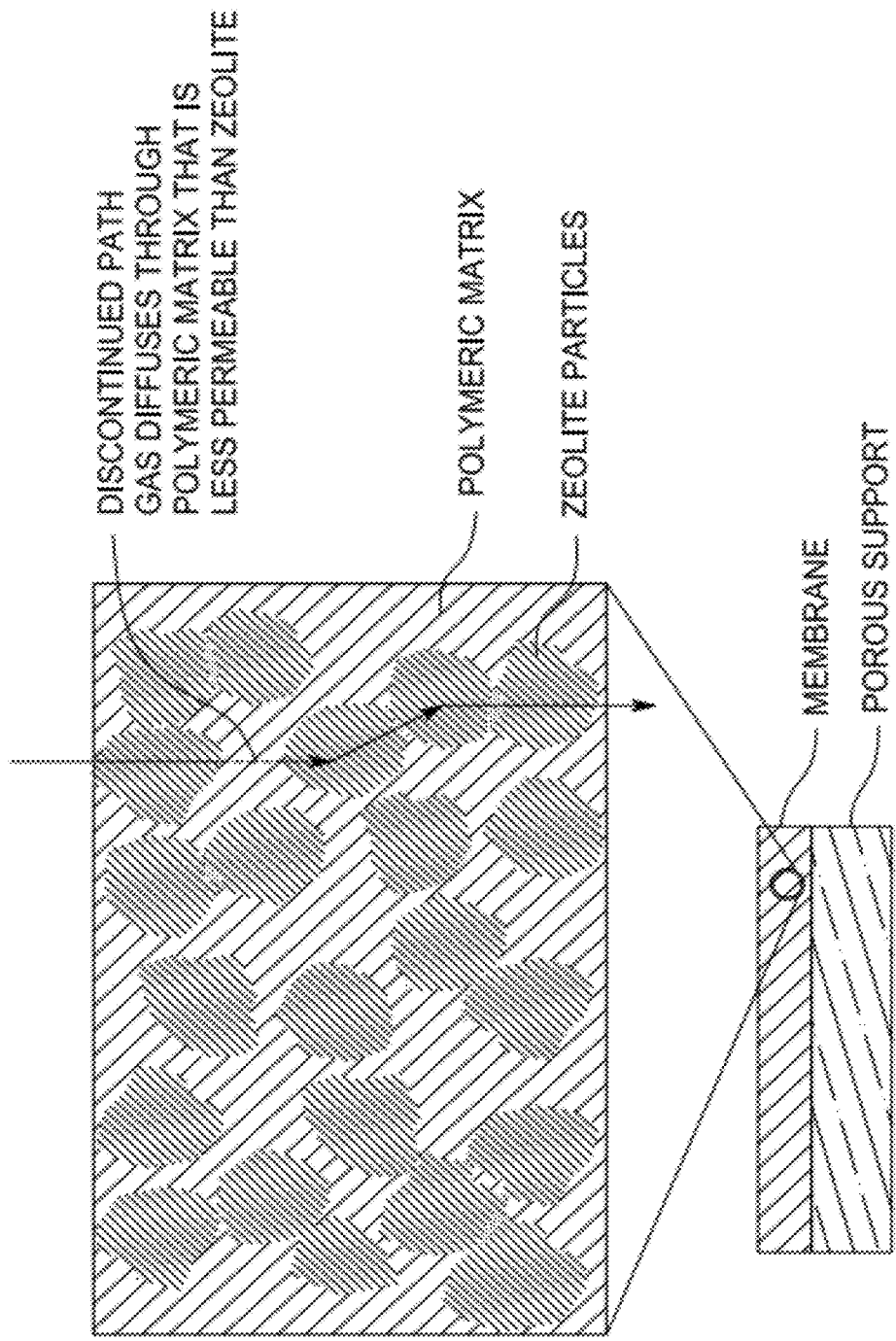
FIG. 12 is a schematic of fabricating a zeolite mixed-matrix membrane by interspersing zeolite particles in a continuous polymer matrix.

FIG. 8 is a field emission scanning electron micrograph (FESEM) micrograph at a magnification of 100× of a cross-section of the supported composite membrane of FIG. 8. An examination of the micrograph reveals the following: (1) the composite membrane is continuous and comprises a single layer of zeolite particles; (2) the composite membrane is attached directly to the surface of the support structure (i.e., ceramic substrate); and (3) the support structure does not exhibit any growth enhancing, selectivity enhancing, or reparation layers.

As described above, the use of zeolite provides unique solutions for applications involving liquid and gas separation. In combination with a support structure, the composite membrane lends itself to installation in a variety of different types of applications that are highly desirable. The process of the invention enables the application and formation of a layer of zeolite particles that than can be converted into a functional zeolite membrane layer. It is important to note that this process provides a nearly defect-free composite membrane as a functional membrane on a support structure.

Equally important is the second function of the composite membrane to serve as a defect repair layer in order to enable the use of low quality or mass-produced and inexpensive support structures. This is of particular importance to enable the use of this process for gas separation applications where the tolerance for defects is extremely low.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claim is:

1. A method for fabricating a free-standing zeolite membrane, comprising:
mixing an optional inorganic binder and naturally-occurring zeolite particles of a Heulandite framework (HEU) to form a dry mixture;
forming the dry mixture into a green body; and
sintering the green body at a sufficiently low temperature so as to prevent damage to the gas selective properties of the zeolite particles, while causing the green body to have sufficient strength to form a free-standing zeolite membrane.

2. The method of claim 1, wherein the inorganic binder is selected from the group consisting of pseudo-boehmite sol, alpha-Alumina, gamma-Alumina, and any combination thereof.

3. The method of claim 1, wherein the zeolite particles have a particle size less than about 200 microns.

4. The method of claim 1, wherein the temperature is less than about 600° C.

5. The method of claim 1, wherein the zeolite particles comprise at least one of Clinoptilolite, Heulandite, or a combination thereof.

6. The method of claim 1, wherein the zeolite particles comprise about 40% to about 100% by volume of the free-standing zeolite membrane.

* * * * *